United States Patent
Soon-Shiong (10) Patent No.: US 11,023,107 B2
(45) Date of Patent: *Jun. 1, 2021

(54) VIRTUAL TELLER SYSTEMS AND METHODS

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/792,112

(22) Filed: Feb. 14, 2020

(65) Prior Publication Data

US 2020/0183557 A1 Jun. 11, 2020

Related U.S. Application Data

(63) Continuation of application No. 14/783,824, filed as application No. PCT/US2014/033966 on Apr. 14, 2014, now Pat. No. 10,564,815.

(Continued)

(51) Int. Cl.
*G06F 3/0484* (2013.01)
*G06Q 50/10* (2012.01)
(Continued)

(52) U.S. Cl.
CPC ............ *G06F 3/0484* (2013.01); *G06F 9/453* (2018.02); *G06N 5/022* (2013.01); *G06Q 30/016* (2013.01); *G06Q 50/10* (2013.01)

(58) Field of Classification Search
CPC ...... G06F 9/4446; G06F 9/453; G06F 3/0484; G06Q 30/016; G06Q 50/10; G06N 5/02
See application file for complete search history.

(56) References Cited

U.S. PATENT DOCUMENTS 5,652,789 A 7/1997 Miner et al.
7,016,532 B2 3/2006 Boncyk et al.
(Continued)

FOREIGN PATENT DOCUMENTS

WO 01/67241 A1 9/2001
WO 2007/020394 A1 2/2007
(Continued)

OTHER PUBLICATIONS

Jeffrey P. Bigham, Chandrika Jayant, Hanjie Ji, Greg Little, and Andrew Miller, Robert C. Miller, Robin Miller, Aubrey Tatarowicz, Brandyn White, Samuel White, and Tom Yeh, "VizWiz: Nearly Real-time Answers to Visual Questions", 2010, UIST' 10, pp. 333-342 . (Year: 2010).*

(Continued)

*Primary Examiner* — Kamran Afshar
*Assistant Examiner* — Ying Yu Chen
(74) *Attorney, Agent, or Firm* — Mauriel Kapouytian Woods LLP; Lana Akopyan; Andrew A. Noble (57) ABSTRACT

A virtual assistant ecosystem is presented. One can instantiate or construct a customized virtual assistant when needed by capturing a digital representation of one or more objects. A virtual assistant engine analyzes the digital representation to determine the nature or type of the objects present. The engine further obtains attributes for a desirable assistant based on the type of objects. Once the attributes are compiled the engine can then create the specific type of assistant required by the circumstances.

33 Claims, 5 Drawing Sheets

Related U.S. Application Data (60) Provisional application No. 61/811,667, filed on Apr. 12, 2013.

(51) Int. Cl.
  *G06Q 30/00* (2012.01)
  *G06F 9/451* (2018.01)
  *G06N 5/02* (2006.01)

(56) References Cited

U.S. PATENT DOCUMENTS

| | | | |
|---|---|---|---|
| 7,836,437 | B2 | 11/2010 | Kacmarcik |
| 7,899,252 | B2 | 3/2011 | Boncyk et al. |
| 7,937,349 | B2 | 5/2011 | Pucher |
| 8,127,236 | B2 * | 2/2012 | Hamilton, II ......... G06N 5/022 715/757 |
| 8,162,125 | B1 | 4/2012 | Csulits et al. |
| 8,224,077 | B2 | 7/2012 | Boncyk et al. |
| 8,224,078 | B2 | 7/2012 | Boncyk et al. |
| 8,346,563 | B1 | 1/2013 | Hjelm et al. |
| 8,391,583 | B1 | 3/2013 | Mennie et al. |
| 9,110,882 | B2 * | 8/2015 | Overell ................. G06N 5/022 |
| 10,564,615 | B2 | 2/2020 | Soon-Shiong |
| 2004/0169722 | A1 | 9/2004 | Pena |
| 2006/0092978 | A1 | 5/2006 | John et al. |
| 2006/0190554 | A1 | 8/2006 | Franz et al. |
| 2008/0096533 | A1 | 4/2008 | Manfredi et al. |
| 2009/0030902 | A1 * | 1/2009 | Aharoni .................. G06F 8/33 |
| 2009/0231441 | A1 | 9/2009 | Walker et al. |
| 2010/0070448 | A1 | 3/2010 | Omoigui |
| 2011/0216179 | A1 | 9/2011 | Dialameh et al. |
| 2012/0265528 | A1 | 10/2012 | Gruber et al. |
| 2013/0088615 | A1 | 4/2013 | Altieri |
| 2013/0139193 | A1 * | 5/2013 | Fan .................. H04N 21/44218 725/14 |
| 2013/0346068 | A1 * | 12/2013 | Solem ..................... G10L 15/26 704/9 |
| 2015/0026785 | A1 | 1/2015 | Soon-Shiong |

FOREIGN PATENT DOCUMENTS

| | | |
|---|---|---|
| WO | 2008/065215 A1 | 6/2008 |
| WO | 2013/126221 A1 | 8/2013 |

OTHER PUBLICATIONS

Antonella Santangelo, Agnese Augello, Salvatore Sorce, Giovanni Pilato, Antonio Gentile, Alessandro Genco, and Salvatore Gaglio, "A Virtual Shopper Customer Assistant in Pervasive Environments", 2007, OTM 2007 Ws, Part I, LNCS 4805, pp. 447-456. (Year: 2007).*

International Search Report and Written Opinion issued in International Application No. PCT/US2014/033966 dated Aug. 4, 2014, 14 pages.

Santangelo et al., "A Virtual Shopper Customer Assistant in Pervasive Environments," OTM Confederated International Conferences "On the Move to Meaningful Internet Systems," 2007, pp. 447-456.

* cited by examiner

VIRTUAL TELLER SYSTEMS AND METHODS

This application is a continuation of U.S. application Ser. No. 14/783,824 filed on Oct. 9, 2015, which is a 371 of PCT/US2014/033966 filed Apr. 14, 2014, which claims the benefit of priority to U.S. Provisional Application No. 61/811,667 filed on Apr. 12, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is assistive technologies.

BACKGROUND

The following description includes information that may be useful in understanding the present invention. It is not an admission that any of the information provided herein is prior art or relevant to the presently claimed invention, or that any publication specifically or implicitly referenced is prior art.

With the advent of pervasive personal cell phones, consumers have a growing desire to interface with information technology in a seamless fashion. Apple®'s Siri™ interface represents one possible interface offered to consumers that allows consumers to access information via voice recognition technology. Unfortunately, Siri merely operates as an interface to a search engine and does not offer actual real-world assistance to a user. A more useful technology would allow users to gain access to assistive technologies that are contextually relevant in a seamless fashion.

Some effort has been directed to providing access to virtual assistants. In a similar vein to Siri, U.S. Pat. No. 8,346,563 to Hjelm et al. titled "System and Methods for Delivering Advanced Natural Language Interaction Applications", filed Aug. 2, 2012, describes a virtual assistant that leverages language recognition rules to form appropriate responses to a user's request. Similar to Hjelm, International patent application publication WO 01/67241 to Ulmer et al. titled "Virtual Assistant Engine" filed Mar. 5, 2001, describes using a speech recognition engine as an interface to a virtual assistant application. From a visual perspective, U.S. Pat. No. 7,836,437 to Kacmarcik titled "Semantic Annotations for Virtual Objects", filed Feb. 10, 2006, indicates that virtual assistants can appear on a monitor to answer questions to provide help with an application and describes scattering pixels across an object identifier to limit recognition of characters in a virtual world. Unfortunately, such approaches have limited applicability to a single purpose and fail to providing insight into how a virtual assistant could provide assistance to a person based on a person's current circumstance.

Interestingly, some effort has been directed to scanning documents to aid in processing documents, but has not been applied for assistive technologies. U.S. Pat. No. 8,162,125 to Csulits et al. titled "Apparatus and System for Imaging Currency Bills and Financial Documents and Method for Using the Same", filed Apr. 13, 2010, describes a teller system having a document processing system capable of applying optical character recognition to currency or checks, and having teller terminals. The Csultis approach is helpful to a bank teller, but fails to appreciate that such information can be leveraged to give rise to assistance of a consumer. Additionally, Csultis only contemplates a single purpose system that populates data fields on a bank teller screen.

Further, some effort has been applied to recognizing consumer features for security reasons. U.S. patent application publication 2004/0169722 to Pena titled "Method and System for Computer-Aided Telecommunication and Financial Transactions", filed Mar. 9, 2004, discusses allowing subscribers to conduct real-time visual communications with remote parties, possibly via automated teller machines. Users can be identified through voice or finger print recognition as an added layer of security. Similarly, international patent application publication WO 2007/020394, to Murdoch et al. titled "Mobile Account Management" filed Aug. 11, 2006, also discusses using fingerprinting and voice pattern recognition as a security measure. Thus, Pena and Murdoch only use recognition technology narrowly to enable authentication for a single purpose system.

Still, some effort has been applied toward offering virtualized ATM services. International patent application publication WO 2008/065215 to Luca De Tena Sainz titled "Method and System for Performing Banking Transactions by Simulating a Virtual ATM by Means of a Mobile Telecommunications Device", filed Feb. 16, 2007, describes a virtual ATM capable of contacting a back agent by a video call and use of voice recognition. Although Luca De Tena Sainz describes virtualized ATM services, Luca De Tena Sainz fails to appreciate that consumers require a broad spectrum of assistant types.

Although the known art seeks to provide assistive technologies, the assistive technologies are purpose built and are not assistive across a broad spectrum of circumstances. Thus, there remains a need to allow consumers to engage with assistive technologies that are applicable to the consumer's circumstances.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which a virtual assistant engine is able to determine a desirable type of assistant and construct such an assistant. One aspect of the inventive subject matter includes a virtual assistant system comprising an assistant database and a virtual assistant engine. The database stores one or more assistant attributes that represents aspects that assistants can have (e.g., name, language, knowledge, proximity, contact information, affiliation, etc.). Further the attributes can be associated with different types of assistants (e.g., healthcare provider, pet, bank teller, therapist, mechanic, etc.). In some embodiments, the assistant attributes are indexed within the database by one or more object type identifiers. For example, assistant attributes can be indexed by an object ontology, a hierarchical object namespace, or other indexing scheme. The virtual assistant engine uses the assistant attributes to construct one or more virtual assistants. The engine can be configured to obtain a digital representation of one or more objects (e.g., image data, sound data, video data, location data, etc.). The engine can apply one or more algorithms to the digital representation to generate digital features, possibly relating to the objects. Example digital features could include features derived from SIFT, BRISK, OCR, audio signature analysis, voice recognition, or other types of algorithms. The engine maps the digital features to at least one object type identifier (e.g., name in namespace, GUID, UUID, hash, etc.). The engine can then use the object type identifier to compile a set of assistant attributes from the database, possibly by submitting a query created from the object type identifier. The engine can further determine an assistant type, if necessary, from the object type identifier. As an example, a document that has features of a check might indicate an object type of "financial document", which in turn might map to "bank teller" as an assistant type. The compiled list of attributes can then be used to construct one or more virtual assistants that have the characteristics of the desirable assistant type. The virtual assistant can be fully autonomous, semi-autonomous, comprise a human, or other features as dictated by the attributes. Once the virtual assistant is instantiated, the engine can enable establishment of a communication link between a device (e.g., a cell phone, tablet, kiosk, etc.) and the virtual assistant.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, host, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the disclosed techniques providing multiple technical effects. One example technical affect including generation of one or more network-based or computer-based signals that configure computing devices to take on the roles or aspects of a virtual assistant.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, the terms the terms "coupled to" and "coupled with" are used euphemistically in a networking context to mean "communicatively coupled with" where two or more devices are configured to exchange data (e.g., uni-directionally, bi-directionally, peer-to-peer, etc.) with each other possibly via one or more intermediary devices.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The inventive subject matter provides apparatus, systems and methods for selectively providing one or more virtual assistants to a user based on a context that is derived from a digital representation of an object. Instead of burdening the user to choose a proper service (e.g., via opening a mobile application, logging onto a website, etc.) for each unique circumstance, the apparatus, systems, and methods disclosed herein analyze digital representation of an object (e.g., an image of an object) and automatically select one or more virtual assistants for the user based on the analysis.

Figure 1:
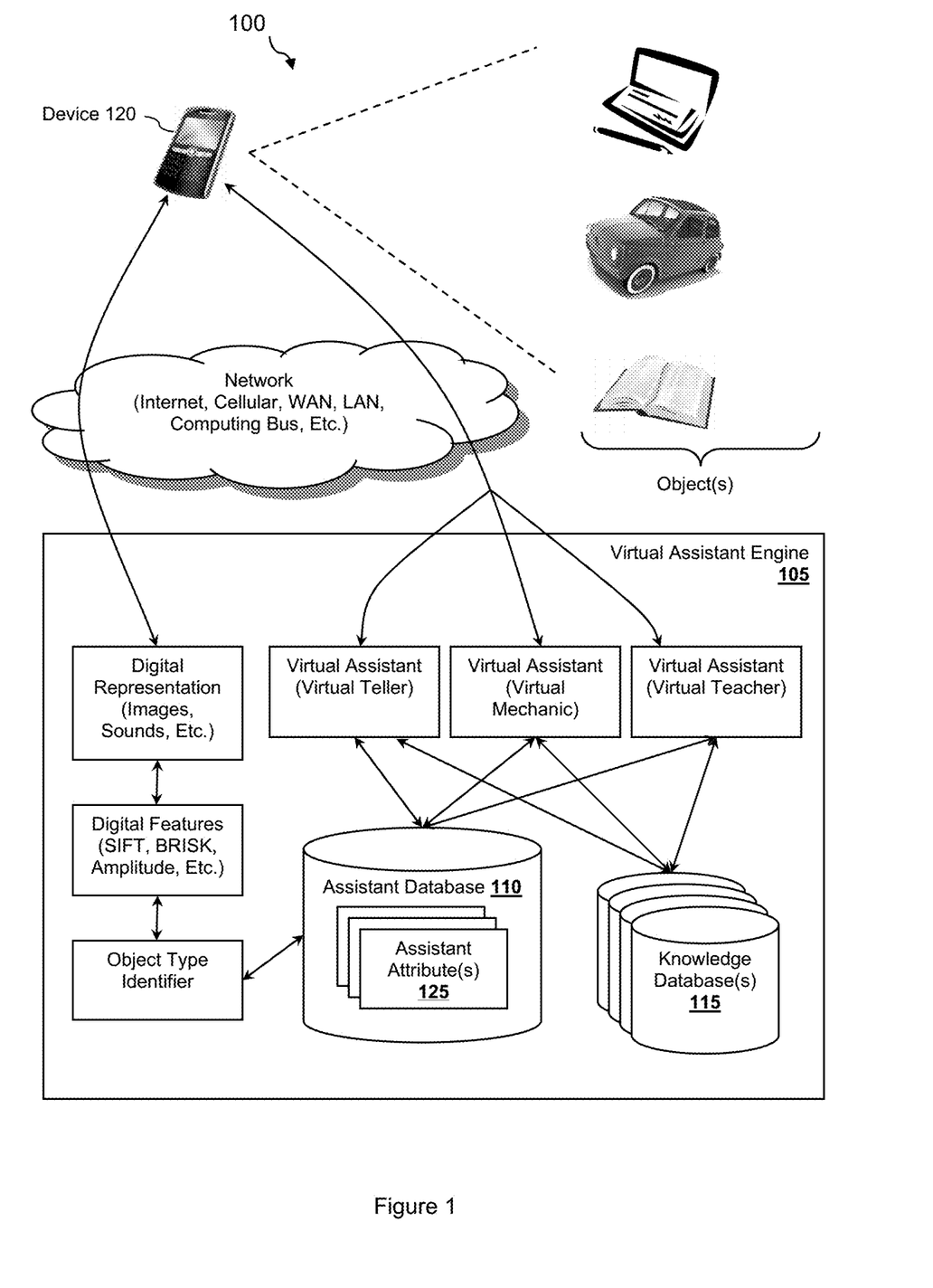
FIG. 1 is a schematic overview of a virtual assistant ecosystem.

FIG. 1 illustrates an overview of a virtual assistant ecosystem 100 where a virtual assistant engine 105 is configured to or programmed to determine a type of assistive technology based on an environment associated with a consumer. The system includes the virtual assistant engine 105 and an assistant database 110. In some embodiments, the system can further include one or more assistance knowledge databases 115 configured to store domain-specific data that is considered relevant to a type of assistance.

The ecosystem 100 also includes a consumer device 120 that is communicatively coupled to the virtual assistant engine 105. Although it is shown in this ecosystem 100 that device 120 is remotely connected to the virtual assistant engine via a network, one should appreciate that the roles or responsibilities of the various inventive elements can be deployed or distributed across suitably configured computing devices. For example, the device 120 (e.g., cell phone, tablet, kiosk, vehicle, appliance, gaming device, vehicle, set top box, ATM, vending machine, etc.) could comprise the virtual assistant engine 105, assistant database 110, and assistance knowledge databases 115. Alternatively, the device 120 could simply comprise one or more small applications that configure the device to couple with a remote virtual assistant engine 105 over the network (e.g., the Internet, cell network, WAN, VPN, LAN, etc.).

In the example shown, the device 120 captures one or more digital representations of one or more various objects (e.g., a check, a car, a book, etc.). One should appreciate that the objects could include any type of object including two dimensional objects (e.g., product codes, text, bar codes, QR codes, holographic codes, posters, magazine articles, printed matter, shadows, paintings, etc.), three dimensional objects (e.g., people, vehicles, trees, animals, buildings, toys, appliances, videos that change with time, etc.), or even four dimensional objects (e.g., 3D objects that move or change with time), or other types of objects.

The assistant database 110 represents a computer system configured to or programmed to store one or more assistant attributes 125, possibly stored as independently manageable data objects. Each of the attributes represents an aspect of a possible virtual assistant. Example assistant attributes can include name, a user preference, a language, analysis algorithms, response algorithms, knowledge databases, digital rights attributes, avatar, security tokens, affiliation, phone number, email address, application program interface, features, security criteria, or other properties that can be used to instantiate a virtual assistant. The assistant attributes 125 can be associated with different types of assistants and can be indexed within the assistant database 110 according to object type identifiers.

The virtual assistant engine 105 obtains a digital representation of one or more of the objects from the device 120. The digital representation can include a digital representation of a broad spectrum of objects, possibly including a person, a face, an image, an image of an image, a time-varying object, a 2D object, a 3D object, a vehicle, a poster, a magazine, a newspaper, an active device, a toy, a check, a financial document, a book, a page of a book, an item of clothing, an animal, a piece of sporting equipment, or other objects. Further, one should appreciate that the digital representation can comprise one or more modalities of data. Example modalities of data can include image data, audio data, video data, location data, time data, social data, friendship data, preference data, biometric data, ambient data, news data, sensor data, or other types of data.

The virtual assistant engine 105 can obtain the digital representation via different schemes depending on the nature of the embodiments. In embodiments where the device 120 includes a cell phone for example, the cell phone 120 can send the digital representation, perhaps as a file storing an image or an audio recording, over a network to the virtual assistant engine 105. For example, the cell phone 120 can establish a communication channel via an HTTP web service or via an API to send the digital representation. In other embodiments where the virtual assistant engine 105 is at least partially disposed within the device, the virtual assistant engine 105 can obtain the digital representation via an internal API call, shared memory, file transfer, or other technique. The device 120 can take on many different forms including a cell phone, a mobile phone, a tablet, a phablet (i.e., a phone-enabled tablet), a vehicle, a kiosk, an appliance, a consumer electronic device, a vehicle, a game console, a sensor platform, or other type of suitably configured computing device.

After receiving the digital representation from the device 120, the virtual assistant engine 105 applies one or more data analysis algorithms to the digital representation to generate digital features related to the objects represented in the digital representation. The nature of the algorithms can be commensurate with the nature of the modality within the digital representation. For example, when the digital representation comprises image data or video data, the engine can apply image processing algorithms to generate the digital features. Example image processing algorithms include SIFT, BRISK, SLAM, vSLAM, or other algorithms known or yet to be invented. Additional processing algorithms include optical character recognition for image text data, support vector machines for speech data, music information retrieval or Parsons Codes for audio data, or other types of processing algorithms. Example digital features can include a scale invariant feature, a descriptor, a location, a time, a position, an orientation, an amplitude, a frequency, an envelope, a juxtaposition (see co-owned international application PCT/US13/25366 titled "Content Activation via Interaction-Based Authentication, Systems and Method", filed Feb. 8, 2013), a touch pattern, a fingerprint derived from the digital representation, a biometric, or other features. Suitable techniques for deriving features can include those disclosed by co-owned U.S. Pat. No. 7,016,532 titled "Image Capture and Identification System and Process"; U.S. Pat. No. 7,899,252 titled "Object Information Derived from Object Images"; U.S. Pat. No. 8,224,077 titled "Data Capture and Identification System and Process"; and U.S. Pat. No. 8,224,078 titled "Image Capture and Identification System and Process".

The virtual assistant engine 105 can map the digital features to at least one object type identifier indicative of a type of object (e.g., a car, a book, a financial document, etc.). In some embodiments, the engine uses the digital features as an index into a database where object types are stored according to corresponding digital features a priori linked to the object type. In other embodiments, the engine uses the digital features to recognize the objects. Once the object is recognized, the engine can obtain an object type from object information or metadata bound to the known object. In some embodiments, the database can comprise at least one tree data structure (e.g., kd-tree, spill tree, etc.) where the object type identifiers are obtained by comparing the digital features to nodes of the tree. Further, each data modality could have a corresponding tree. The final result set of object types could include the intersection, or other overlap, of object types returned from each tree.

In some embodiments, the object type identifiers adhere to an object-type ontology where each identifier can be a name in a namespace, a GUID, a hash value, or other identifier. In other embodiments, the object type identifiers adhere to one or more hierarchical object namespaces. For example, the object type identifiers could adhere or a "vehicle" namespace, a "healthcare" namespace, a "financial" namespace, or other namespaces. One should appreciate that the object type identifiers could be derived according to a hybrid of an ontology, a hierarchy, or other object identification scheme (e.g., taxonomy, domains, categorizations, classifications, etc.).

The virtual assistant engine 105 can construct one or more queries as a function of the object type identifier, possibly along with any other relevant information (e.g., location, user preferences, time, weather, context, intent, etc). The engine 105 can then submit the query to the assistant database 110. In response, the assistant database 110 returns a results set of assistant attributes (e.g., assistant attributes 125) that satisfy the criteria of the query. Further, the engine can use the object type identifier to identify an assistant type, if applicable.

The virtual assistant engine 105 leverages the results set of assistant attributes 125 to compile a listing of attributes considered relevant to a current circumstance or context. For example, the query might be based on an object type identifier representing a "vehicle". The results set could include attributes associated with mechanics, car salesmanship, driving assistance, navigation, or other features. The engine 105 could further refine the listing based on a specifically requested assistant, possibly via voice command from the user. Perhaps a user captured an image of their car and verbally requested road side assistance. In response, the engine selects attributes associated with mechanics and mobile assistance (e.g., AAA, On-Star, etc.) while filtering sales or navigation attributes.

The virtual assistant engine 105 uses the plurality of assistant attributes, object type identifier, assistant type, or other information to construct a virtual assistant for the user. The attributes can define the nature of the virtual assistant to be constructed or otherwise instantiated. In some embodiments, the virtual assistant can be a completely autonomous, custom built expert system possibly leveraging one or more assistance knowledge databases. For example, should the virtual assistant be an auto mechanic, the assistance knowledge database could be selected according to make or model of a vehicle where the instantiated virtual assistant uses the selected assistance knowledge database to respond to questions.

In some embodiments, the instantiated virtual assistant could be instantiated within a virtual machine. Such an approach is considered advantageous because it allows remote entities to retain control over the virtual assistant via manipulation of the virtual machine. For example, a user could instantiate a desirable virtual assistant of a proper type, say a bank teller, on their smart phone and in a virtual machine where the teller has access to bank related information obtained directly from a financial assistance knowledge database. The bank can monitor or control use of the virtual machine environment to ensure the bank's data or rights are protected. The bank could restrict user access to data stored in a secured portion of the virtual machine, control parameters or properties of the virtual assistant within the virtual machine, or otherwise manipulate the virtual machine.

One should appreciate that the virtual assistant can also be semi-autonomous where one or more humans provide some level of input to the assistant while not interfacing directly with the user. A semi-autonomous virtual assistant could comprise a mechanical turk system where humans aid in selecting one or more recommendations from the virtual assistant where the most popular selected recommendation is provided to the user. Alternatively, the virtual assistant could comprise a user interface to a human providing direct input. For example, the human assistant could be presented with a user interface allowing the user to communicate directly with a user, possibly via an avatar. The avatar can be superimposed or overlaid on a displayed image rendered on the display of the device. In such an embodiment suitable techniques that could be adapted for use with interfacing with human assistant are describe in U.S. 20110216179 to Dialameh titled "Augmented Reality Panorama Supporting Visually Impaired Individuals", filed Feb. 24, 2011.

Figure 2:
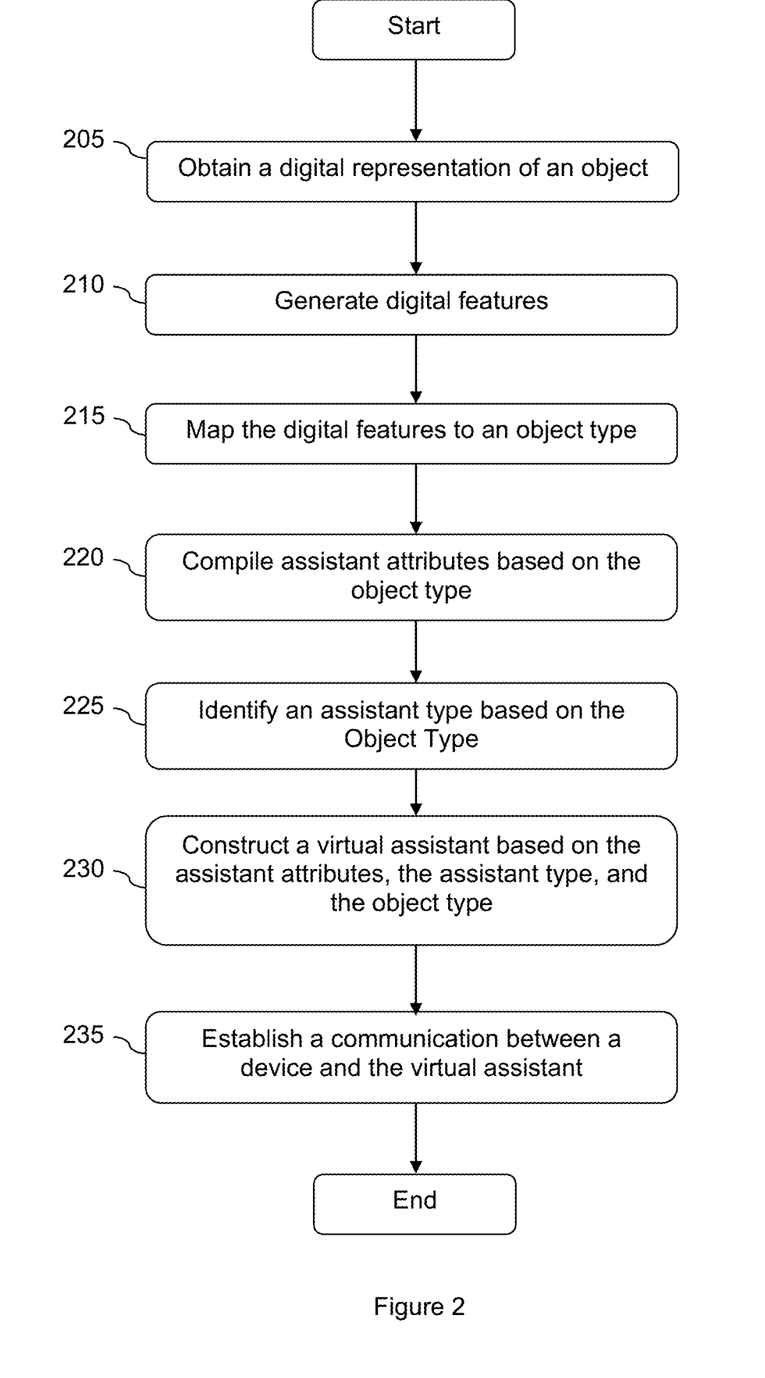
FIG. 2 illustrates a process of constructing a virtual assistant based on a user's context.

FIG. 2 illustrates a process 200 for instantiating a virtual assistant for a user selected based on a digital representation of an object. The process 200 begins with obtaining (at step 205) a digital representation of an object. For example, a consumer device such as a camera or a smart phone can capture an image of a scene that contains an object (e.g., a car, a financial document, a book, etc.) and send the image to the virtual assistant engine 105. The process 200 then generates (at step 210) digital features of the object. As mentioned above, different algorithms can be used to generate the digital features from the digital representation, sometimes depending on the type of digital representation obtained by the engine 105. In some embodiments, these features can be used by an object recognition system to recognize the object from which they are derived.

As such, the process 200 of some embodiments uses the object recognition software to map (at step 215) the digital features to an object type. As mentioned above the assistant database 110 stores a set of assistant attributes 125. Each of the assistant attributes 125 can be associated with one or more object types. Therefore, the process 200 compiles (at step 220) one or more assistant attributes that are associated with the mapped object type.

In some embodiments, the process 200 also identifies (at step 225) an assistant type based on the mapped object type. Using the assistant attributes, the assistant type, and the object type, the process 200 then constructs (at step 230) a virtual assistant for the user. The process 200 then establishes (at step 235) a communication between a device of the user and the virtual assistant.

Figure 3:
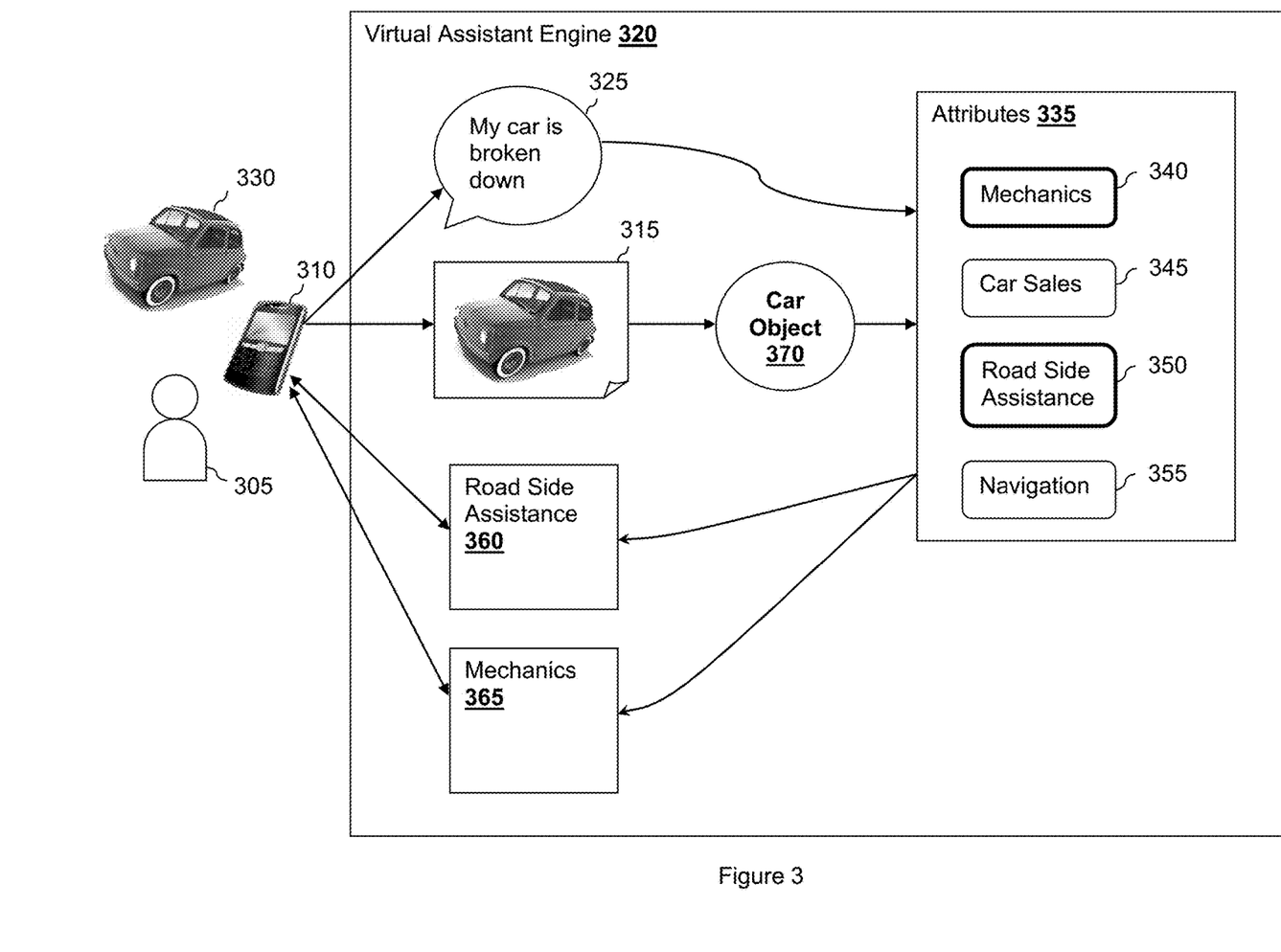
FIG. 3 illustrates an example of constructing a virtual assistant based on a user's context.

Each of the steps of the process 200 will be illustrated in more details by way of the following examples. FIG. 3 illustrates a first example of constructing a virtual assistant based on a digital representation captured by a user. In this example, a user 305 uses a mobile device 310 to capture an image 315 of a car 330. In addition to the image 315, the user 305 also provides further instructions "my car is broken down" via voice. The device encodes the instructions as audio data 325 and then sends both the image 310 and audio instructions 325 to a virtual assistant engine 320.

The engine 320 performs analyses to the image 315 to derive a set of features, which allows the engine 320 to recognize that the object within the image 315 is a car object 370. The engine can use this information to compile a list of attributes 335 associated with the recognized object 370. In this example, the engine 320 compiles the list of attributes 335 that includes a mechanics attribute 340, a car sales attribute 345, a road side assistance attribute 350, and a navigation attribute 355.

In some embodiments, the engine 320 can use the additional instructions 325 to further refine the list of attributes 335. In this example, the engine 320 can use a voice recognition system to recognize the words and derive meaning out of the words. Once the engine 320 understands that the user 305 has a broken-down car, the engine 320 can eliminate the car sales attribute 345 and navigation attribute 355.

With the refined list of attributes 335, the engine 320 can construct a road side assistance virtual assistant 360 and a mechanics virtual assistant 365 for the user 305, by establishing a connection between the device 310 and the virtual assistants 360 and 365 such that the user 305 can obtain services (e.g., road side assistance services, mechanics services) via the device 310.

Figure 4:
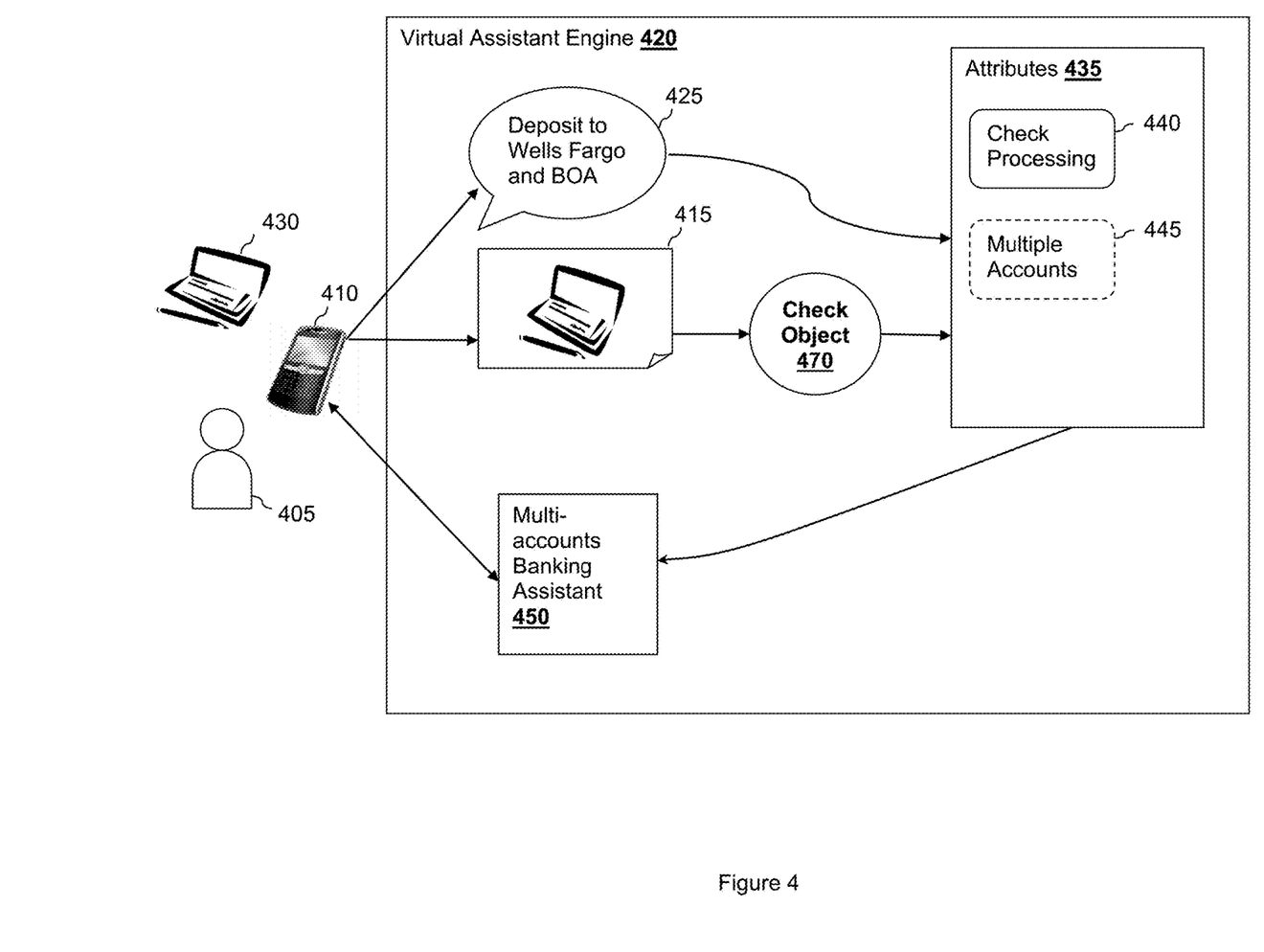
FIG. 4 illustrates another example of constructing a virtual assistant based on a user's context.

FIG. 4 illustrates another example of constructing a virtual assistant based on a digital representation captured by a user. In this example, a user 405 uses a mobile device 410 to capture an image 415 of a check 430. In addition to the image 415, the user 405 also provides further instructions "deposit to Wells Fargo and BOA" via voice. The device encodes the instructions as audio data 425 and then sends both the image 410 and audio instructions 425 to a virtual assistant engine 420.

The engine 420 performs analyses to the image 415 to derive a set of features, which allows the engine 420 to recognize that the object within the image 415 is a check object 470. The engine can use this information to compile a list of attributes 435 associated with the recognized object 470. In this example, the engine 420 compiles the list of attributes 435 that includes a check processing attribute 340.

In some embodiments, the engine 420 can use the additional instructions 425 to add more attributes to the list of attributes 435. In this example, the engine 420 can use a voice recognition system to recognize the words and derive meaning out of the words. Once the engine 420 understands that the user 405 wants to deposit the check 430 into multiple accounts, the engine 420 can add a multiple accounts attribute 445 to the list 435.

With the refined list of attributes 435, the engine 420 can construct a multi-accounts banking virtual assistant 450 for the user 405, by establishing a connection between the device 410 and the virtual assistant 450 such that the user 405 can obtain services (e.g., banking services for multiple bank accounts) via the device 410. Alternatively, rather than creating assistant 450, the system could instantiate two virtual assistants, one for Wells Fargo and one for BOA. Further, based on the nature of the inferred transaction, the two assistants can negotiate a communication protocol between the assistants. In the example show, no communication protocol might be necessary as money is just being deposited in both accounts, possibly independent of each other. However, if money is transferred from one account to another, then during instantiation the assistants can establish a communication back-channel through which the transfer can take place.

Figure 5:
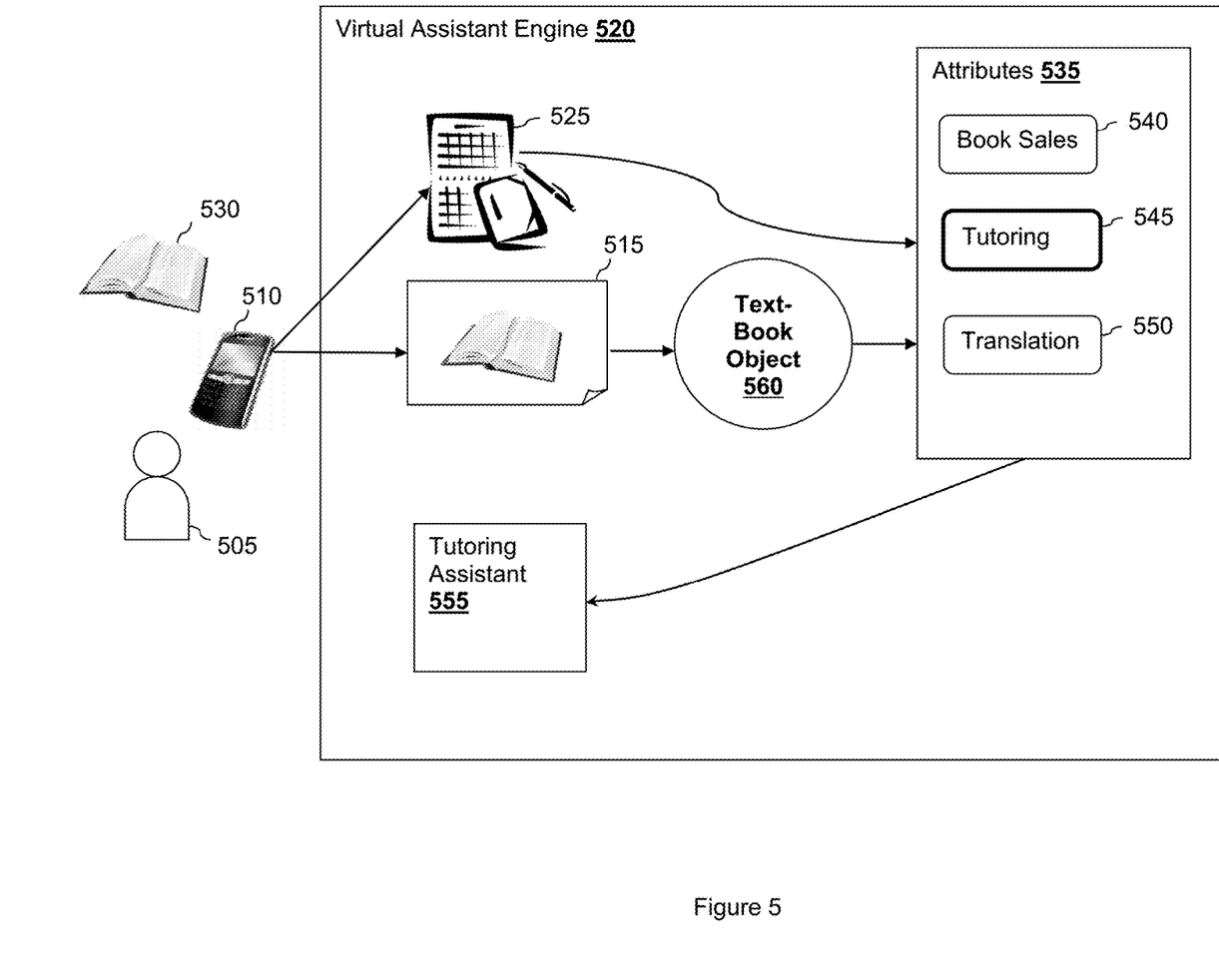
FIG. 5 illustrates yet another example of constructing a virtual assistant based on a user's context.

FIG. 5 illustrates yet another example of constructing a virtual assistant based on a digital representation captured by a user. In this example, a user 505 uses a mobile device 510 to capture an image 515 of a book 530.

The engine 520 performs analyses to the image 515 to derive a set of features, which allows the engine 520 to recognize that the object within the image 515 is a book. In some embodiments, once the engine 520 recognizes that the object in the image 515 is a book, the engine 520 can also performs a text recognition analysis on the text of the book 530 to identify a more refined object from the image 515. In this example, the engine 520 recognizes that the book is indeed a textbook object 570 by the recognized text on the book 530. The engine then use this information to compile a list of attributes 535 associated with the recognized object 570. In this example, the engine 520 compiles the list of attributes 535 that includes a book sales attribute 540, a tutoring attribute 545, and a translation attribute 550.

In some embodiments, the engine 520 can use additional information retrievable from the device 510 to give more context for the circumstance which the user 505 is having. The additional context can help the engine 520 in refining the list of attributes 535. For example, the engine 520 can retrieve calendar information 525 from the device 510. In this example, the engine 520 recognizes that the textbook 530 is an algebra textbook and the calendar information 525 indicates that the user 505 is having an algebra class the next day. As such, the engine 520 can use the calendar information 525 to remove the book sales attribute 540 and the translation attribute 550. Thus, the refined list of attributes 535 now includes only the tutoring attribute 545.

With the refined list of attributes 535, the engine 520 can construct a tutoring virtual assistant 555 for the user 505, by establishing a connection between the device 510 and the virtual assistant 555 such that the user 505 can obtain services (e.g., tutoring services) provided by the tutoring virtual assistant 555 via the device 510.

Each virtual assistant can be constructed according to a type of assistance. In the examples shown, four different virtual assistants have been instantiated for the different users. A virtual teller has been constructed to aid the user in processing a check, a virtual mechanic has been constructed to aid the user in repairing a car, and finally a virtual teacher has been constructed to aid in homework. Of particular note each type of virtual assistant can be custom created based on the type or nature of the objects as illustrated. Still, the type of virtual assistant can be just as varied as the objects captured via the digital representation. Additional types of virtual assistants include a virtual shopper, a virtual consultant, a virtual security guard, a virtual healthcare provider, a virtual support person, a virtual call center person, a virtual companion, a virtual pet, or other types of assistants.

Regardless of the type of the virtual assistant, the virtual assistant engine causes establishment of a communication link between the device and the virtual assistant so that the user of the device can engage the assistant as desired. For example, in embodiments where the virtual assistant comprises a user interface to a human, the communication link could include a remote connection (e.g., chat, phone call, video conference, etc.) with the human assistant. The nature of the communication link can also vary depending on the nature of the assistant. Example links include a video link, an email link, a messaging link, a voice link, a tactile link, a gaming link, a shared internal memory, an application program interface call, a proprietary protocol, a chat link, or other type of channel. One should appreciate that the communication link can be secured; especially in scenarios were it is desirable to keep the information exchanged confidential. Thus, the link can include a secured channel where the channel is secured according to security attributes determined from the digital features. As an example, an image of a person's face could be used to create or obtain a security token that can operate as an encryption or decryption key. Example security attributes can include a protocol (e.g., SSH, SSL, etc.), a key, a hash, an algorithm (e.g., AES, DES, 3DES, etc), a certificate, or other security property.

As a use-case consider a scenario where a user wishes to deposit a check into multiple accounts. The user can capture an image of the check with their cell phone. The cell phone, operating as a virtual assistant engine, obtains the image of the check and processes the image through several algorithms. One algorithm could be based on SIFT, which results in scale invariant features representative of the background image of the check or signature on the check. An optical character recognition algorithm can read the text of the check. Yet another algorithm can decode the MICR line. As a result of the algorithms, the cell phone obtains a set of features (e.g., SIFT features, text, decoded MICR, etc.) and uses the features to determine the type of object. In this case, the existence of the MICR line or decoded routing numbers can be used to select an object type identifier. The type identifier could be determined by a look up table or via a database. The object type identifier could be from a hierarchical namespace, perhaps of the form "object.printed_media.document.financial.check". Based on this information, the cell phone can obtain assistant attributes by requesting assistant attributes that support check process, multiple accounts, or other aspects. Example assistant attributes might include a bank teller avatar, a bank teller name, a preferred communication language, a bank phone number, a bank address, one or more account numbers, a knowledge database about check processing, one or more check processing rule sets, advertisements, or other attributes. In response cell phone can instantiate an automated bank teller with the desired features and coupled with the target bank. In view that the cell phone can instantiate a virtual teller, it is possible for the system to also construct a virtual call center, bank lobby, or other features to aid the user.

The virtual assistants can be instantiated on many factors related to the environment of the end user. One set of factors can include social media or social network features. For example, a virtual assistant could be bound to a group of people, say a family or circle of friends. Consider a scenario where a group of friends are shopping, but are distributed around a mall. A common virtual assistant could be instantiated and shared among the friends. The assistant can offer shared, or uniform, advice across all members of the group. Other examples of shared virtual assistants include an administrative assistant for an office, teaching assistant, a nanny, or other type of assistant that interacts with a group of people.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A virtual assistant system comprising:
one or more processors; and
at least one non-transitory memory device storing software instructions that, when executed by the one or more processors, cause the one or more processors to:
obtain a digital representation of one or more objects associated with a user device, wherein the one or more objects are observed as represented in a scene captured in the digital representation, and wherein the scene includes at least one of a two-dimensional object, a three-dimensional object, and a four-dimensional object;
identify at least two digital features of at least one of the one or more objects from the digital representation in accordance with at least two data modalities observed in the digital representation, the at least two data modalities selected from a modality group comprising image data and auditory data;
based on the at least two digital features, determine at least one object type identifier indicative of an object type using object recognition processes;
compile a plurality of assistant attributes using the at least one object type identifier;
instantiate a virtual assistant that has a refined list of assistant attributes from the plurality of assistant attributes and is associated with the object type; and
establish a communication link between the user device and the virtual assistant.

2. The system of claim 1, wherein the modality group further comprises at least one of location data, time data, and biometric data.

3. The system of claim 1, wherein the digital representation includes at least one of the following data modalities: image data, audio data, video data, location data, time data, biometric data, and news data.

4. The system of claim 1, wherein the at least one object type identifier adheres to an object type ontology.

5. The system of claim 1, wherein the at least one object type identifier adheres to a hierarchical object namespace.

6. The system of claim 1, wherein the virtual assistant comprises a user interface to a human assistant.

7. The system of claim 6, wherein the communication link comprises a remote connection to the human assistant.

8. The system of claim 1, wherein the virtual assistant comprises an automated assistant.

9. The system of claim 1, wherein the virtual assistant comprises an instantiated virtual assistant.

10. The system of claim 9, wherein the virtual assistant comprises a virtual machine within which the virtual assistant operates.

11. The system of claim 1, wherein the virtual assistant comprises an avatar.

12. The system of claim 11, wherein the one or more processors are further caused to present the avatar overlaid on a displayed image rendered on a display of the user device.

13. The system of claim 1, wherein the one or more processors are further caused to obtain the digital representation of the object are disposed within the user device.

14. The system of claim 13, wherein the user device comprises at least one of the following: a cell phone, a mobile phone, a table, a phablet, a vehicle, a kiosk, an appliance, a consumer electronic device, a game console, and a sensor platform.

15. The system of claim 1, wherein the communication link comprises at least one of the following: a video link, an email link, a messaging link, a voice link, a tactile link, a gaming link, a shared internal memory, an application program interface call, and a proprietary protocol.

16. The system of claim 1, wherein the virtual assistant comprises at least one of the following: a virtual bank teller, a virtual shopper, a virtual teacher, a virtual consultant, a virtual security personnel, a virtual healthcare provider, a virtual support person, a virtual call center person, a virtual companion, and a virtual pet.

17. The system of claim 1, further comprising a plurality of assistance knowledge databases associated with different assistant types.

18. The system of claim 17, wherein the one or more processors are further caused to select at least one assistance knowledge database according to an assistant type based on the at least one object type identifier.

19. The system of claim 18, wherein the virtual assistant comprises an interface to the at least one assistance knowledge database selected.

20. The system of claim 1, wherein the communication link comprises a secured channel.

21. The system of claim 20, wherein the one or more processors are further caused to secure the secured channel according to security attributes determined from the at least two digital features.

22. The system of claim 21, wherein the security attributes include at least one of the following: a security protocol, a key, a hash, an algorithm, and a certificate.

23. The system of claim 1, wherein the at least two digital features include at least one of the following: a scale invariant feature, a descriptor, a location, a position, an orientation, an amplitude, a frequency, an envelope, a juxtaposition, a touch pattern, a fingerprint derived from the digital representation, and a biometric.

24. The system of claim 1, wherein the one or more objects comprise at least one of the following: a person, a face, an image, an image of an image, a time-varying object, a 2D object, a 3D object, a vehicle, a poster, a magazine, a newspaper, an active device, a toy, a check, a financial document, a book, a page of a book, an item of clothing, an animal, and a piece of sporting equipment.

25. The system of claim 1, wherein the digital representation is captured by a user of the user device for association with a user request for assistance.

26. The system of claim 1, wherein the identifying comprises executing an implementation of at least one processing algorithm for digital feature derivation.

27. The system of claim 1, wherein an object type database storing the at least one object type identifier comprises one or more tree data structures.

28. The system of claim 27, wherein a final result set of object types indicated by the at least one object type identifier includes an intersection, or other overlap, of object types returned from at least one tree data structure of the one or more tree data structures.

29. The system of claim 1, wherein the compiling includes obtaining at least one of user-generated and device-generated information that is contextual to circumstances of a user request.

30. The system of claim 29, wherein the compiling includes removing assistant attributes from the plurality of assistant attributes determined to not correspond to the at least one object type identifier based on the at least one of user-generated and device-generated information to generate the refined list of assistant attributes.

31. The system of claim 29, wherein the compiling includes adding assistant attributes to the plurality of assistant attributes that are determined to correspond to the at least one object type identifier based on the at least one of user-generated and device-generated contextual information.

32. A computerized method for implementing a virtual assistant, the method comprising:
    obtaining a digital representation of one or more objects associated with-a user device, wherein the one or more objects are observed as represented in a scene in the digital representation, and wherein the scene includes at least one of a two-dimensional object, a three-dimensional object, and a four-dimensional object;
    identifying at least two digital features of at least one of the one or more objects from the digital representation in accordance with at least two data modalities observed in the digital representation, the at least two data modalities selected from a modality group comprising image data and auditory data;
    based on the at least two digital features, determining at least one object type identifier indicative of an object type using object recognition processes;
    compiling a plurality of assistant attributes using the at least one object type identifier;
    instantiating a virtual assistant that has a refined list of assistant attributes from the plurality of assistant attributes and is associated with the object type; and
    establishing a communication link between the user device and the virtual assistant.

33. A computer program product embedded in a non-transitory computer readable medium comprising instructions executable by a computer processor for implementing a virtual assistant, the instructions being executable by a computer processor to execute processing comprising:
    obtaining a digital representation of one or more objects associated with-a user device, wherein the one or more objects are observed as represented in a scene in the digital representation, and wherein the scene includes at least one of a two-dimensional object, a three-dimensional object, and a four-dimensional object;
    identifying at least two digital features of at least one of the one or more objects from the digital representation in accordance with at least two data modalities observed in the digital representation, the at least two data modalities selected from a modality group comprising image data and auditory data;

based on the at least two digital features, determining at least one object type identifier indicative of an object type using object recognition processes;

compiling a plurality of assistant attributes using the at least one object type identifier;

instantiating a virtual assistant that has a refined list of assistant attributes from the plurality of assistant attributes and is associated with the object type; and establishing a communication link between the user device and the virtual assistant.

* * * * *